United States Patent
Yamaguchi et al.

(10) Patent No.: US 11,859,050 B2
(45) Date of Patent: Jan. 2, 2024

(54) SILANOL-GROUP-TERMINATED POLYOXYALKYLENE COMPOUND AND PRODUCTION PROCESS THEREFOR, ROOM-TEMPERATURE-CURABLE COMPOSITION, SEALING MATERIAL, AND ARTICLE

(71) Applicant: SHIN-ETSU CHEMICAL CO., LTD., Tokyo (JP)

(72) Inventors: Takahiro Yamaguchi, Annaka (JP); Masayuki Ikeno, Annaka (JP); Isao Iwasaki, Annaka (JP); Takafumi Sakamoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/091,043

(22) PCT Filed: Feb. 28, 2017

(86) PCT No.: PCT/JP2017/007648
§ 371 (c)(1),
(2) Date: Oct. 3, 2018

(87) PCT Pub. No.: WO2017/187762
PCT Pub. Date: Nov. 2, 2017

(65) Prior Publication Data
US 2019/0135978 A1 May 9, 2019

(30) Foreign Application Priority Data

Apr. 26, 2016 (JP) ................................. 2016-088137
Aug. 4, 2016 (JP) ................................. 2016-153413

(51) Int. Cl.
| | | |
|---|---|---|
| *C09J 171/02* | (2006.01) | |
| *C08G 65/336* | (2006.01) | |
| *C08G 77/46* | (2006.01) | |
| *C08L 83/12* | (2006.01) | |
| *C08L 71/02* | (2006.01) | |
| *C09K 3/10* | (2006.01) | |

(52) U.S. Cl.
CPC .......... *C08G 65/336* (2013.01); *C08G 77/46* (2013.01); *C08L 71/02* (2013.01); *C08L 83/12* (2013.01); *C09K 3/10* (2013.01); *C09K 3/1018* (2013.01)

(58) Field of Classification Search
CPC .............................. C08G 77/46; C08G 65/336
See application file for complete search history.

(56) References Cited

U.S. PATENT DOCUMENTS 10,040,923 B2 * 8/2018 Yamaguchi .............. C08K 5/57
2009/0171025 A1 * 7/2009 Matsushita .......... C08G 65/336
525/100

FOREIGN PATENT DOCUMENTS

| JP | 63-125524 A | 5/1988 |
|---|---|---|
| JP | 5-125176 A | 5/1993 |
| JP | 2000-136312 A | 5/2000 |
| JP | 2000-327771 A | 11/2000 |
| JP | 2006-267401 A | 10/2006 |
| JP | 2006-335936 A | 12/2006 |
| JP | 4034716 B2 | 1/2008 |
| JP | 2009-13430 A | 1/2009 |
| JP | 2010-209205 A | 9/2010 |
| JP | 2013-213229 A | 10/2013 |
| WO | WO 2015/194340 | * 12/2015 |

OTHER PUBLICATIONS

International Search Report, issued in PCT/JP2017/007648, dated May 23, 2017.
Written Opinion of the International Searching Authority, issued in PCT/JP2017/007648, dated May 23, 2017.

* cited by examiner

*Primary Examiner* — Marc S Zimmer
(74) *Attorney, Agent, or Firm* — Birch, Stewart, Kolasch & Birch, LLP

(57) ABSTRACT

Provided is a novel polyoxyalkylene compound which contains, at a molecular chain terminal, at least one reactive silicon-containing group represented by formula (1) per molecule and which has a main chain that is a polyoxyalkylene polymer. Also provided are: a process for producing the novel polyoxyalkylene compound; a room-temperature-curable composition which includes the compound as a main component and can contain any of various crosslinking agents; a sealing material; and an article.

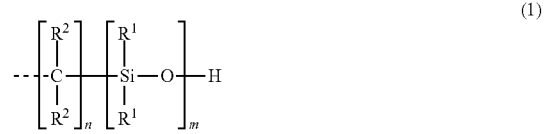

(1)

(In formula (1), $R^1$ and $R^2$ are each a monovalent hydrocarbon group, a hydrogen atom, or a triorganosiloxy group; n is 2 or larger; m is 1 or larger; and the broken line is a linking bond).

1 Claim, No Drawings

SILANOL-GROUP-TERMINATED POLYOXYALKYLENE COMPOUND AND PRODUCTION PROCESS THEREFOR, ROOM-TEMPERATURE-CURABLE COMPOSITION, SEALING MATERIAL, AND ARTICLE

TECHNICAL FIELD

The present invention relates to a novel polyoxyalkylene compound containing a reactive silicon group having a hydroxy group bonded to a silicon atom (that is, a silanol group) at a molecular chain terminal (particularly at both molecular chain terminals) as a silicon group (hereinafter also referred to as "reactive silicon group") which can be crosslinked by forming a siloxane bond and having a main chain of a polyoxyalkylene polymer, a process for producing the novel polyoxyalkylene compound, a room-temperature-curable composition containing the polyoxyalkylene compound as a main component (base polymer), particularly a room-temperature-curable composition containing an organosilicon compound having a hydrolyzable silyl group in a molecule thereof as a curing agent (crosslinking agent), a sealing material formed of the room-temperature-curable composition, and an article bonded and/or sealed with a cured product of the room-temperature-curable composition.

BACKGROUND ART

A reactive silicon group, particularly a reactive silicon group having a silanol group is hydrolyzed and condensed in the presence of water. A polymer having the reactive silicon group is crosslinked and cured in the presence of moisture, and can be used as a curable composition. Among these polymers, a polymer having a main skeleton of polyoxyalkylene is generally known as a modified silicone. A curable composition using the modified silicone is liquid at room temperature (23° C.±10° C.), becomes a rubber elastic body by curing, and is widely used for a building sealant and the like.

These polymers desirably have an appropriate speed during curing. A rubbery cured product desirably has non-tackiness on a surface, high elongation properties as tensile properties, and rubber elasticity with high flexibility. Many proposals have been made on a process for producing an organic polymer having a reactive silicon group in a molecule thereof, and some of the organic polymers have already been industrially produced. Examples thereof include an organic polymer (trade name: MS polymer) to having a main chain of polyoxypropylene and having a terminal bonded to a dimethoxysilyl group, produced and sold by Kaneka Corporation.

This organic polymer has an appropriate curing rate during curing, but industrially limited to a polymer having a dimethoxysilyl group at a terminal, and an organic polymer having a silanol group at a terminal is not used. Therefore, the type of a composition cured by condensation crosslinking is limited to a compound having a reactive group (dimethoxysilyl group) at a polymer terminal. Therefore, a condensation curable compositions using, for example, an oxime type, an amide type, an aminoxy type, or an acetic acid type other than an alkoxy type as a curing agent is not sufficiently cured in some cases, development of a composition utilizing various properties is limited, and improvement has been required.

Note that the following documents are cited as related art related to the present invention.

PRIOR ART DOCUMENTS

Patent Documents

Patent Document 1: JP 4034716
Patent Document 2: JP-A 2010-209205

SUMMARY OF INVENTION

Technical Problem

The present invention has been achieved in view of the above circumstances. An object of the present invention is to provide a novel polyoxyalkylene compound containing a reactive silicon group having a hydroxy group bonded to a silicon atom (that is, a silanol group) at a molecular chain terminal (particularly at both molecular chain terminals) and having a main chain of a polyoxyalkylene polymer, the polyoxyalkylene compound being preferably applicable as a main component (base polymer) for producing a room-temperature-curable composition (so-called silicon-containing RTV composition, particularly modified silicone RTV composition) which can use various kinds of crosslinking components such as an oxime type, an amide type, an aminoxy type, and an acetic acid type in a curable composition mainly containing an organic polymer having at least one hydroxy group or hydrolyzable group bonded to a silicon atom at a molecular chain terminal as a reactive silicon group which can be crosslinked by forming a siloxane bond, a process for producing the novel polyoxyalkylene compound, a room-temperature-curable composition containing the polyoxyalkylene compound, a sealing material formed of the room-temperature-curable composition, and an article bonded or sealed with a cured product of the room-temperature-curable composition.

Solution to Problem

As a result of intensive studies to achieve the above object, the present inventors have found that a novel polyoxyalkylene compound having at least one, preferably two or more silanol group-containing reactive silicon groups in one molecule thereof at a molecular chain terminal (particularly at both molecular chain terminals) as a partial structure and having a main chain of a polyoxyalkylene polymer is preferably applicable as a main component (base polymer) of a room-temperature-curable composition (so-called silicon-containing RTV composition, particularly modified silicone RTV composition).

In addition, the present inventors have found that by using the polyoxyalkylene compound as a main component (base polymer) of a room-temperature-curable composition, compared with a case where an organic polymer having an alkoxysilyl group at a terminal is conventionally used as a main component (base polymer) and therefore a functional group (hydrolyzable group) of a crosslinking agent is limited only to an alkoxy group which can undergo a condensation reaction with an alkoxy group of the base polymer, not only an alkoxy group but also various curing agents (for example, an organosilicon compound containing a hydrolyzable group such as oxime, amide, aminoxy, acetic acid (acetoxy group), or alcohol (alkoxy group)) can be theoretically used as a crosslinking component, and various curing reaction (condensation reaction) type room-temperature-curable compositions (particularly a modified silicone RTV compositions) can be obtained, leading to completion of the present invention.

Therefore, the present invention provides the following novel polyoxyalkylene compound and a process for producing the same, and a room-temperature-curable composition, a sealing material, an article, and the like each containing the compound.

[1]

A polyoxyalkylene compound having at least one reactive silicon group represented by the following structural formula (1) at a molecular chain terminal in one molecule thereof and having a main chain of a polyoxyalkylene polymer:

[Chem. 1]

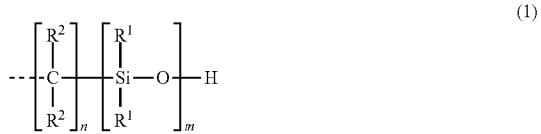

(1)

wherein $R^1$ and $R^2$ may be the same or different, and each represents an unsubstituted or substituted monovalent hydrocarbon group having 1 to 20 carbon atoms, a hydrogen atom, or a triorganosiloxy group represented by $(R^3)_3Si$—O— ($R^3$ represents a monovalent hydrocarbon group having 1 to 20 carbon atoms, and three $R^3$s may be the same or different), n represents an integer of 2 or more, m represents an integer of 1 or more, and the broken line represents a linking bond.

[2]

The polyoxyalkylene compound according to [1], represented by the following structural formula (2):

[Chem. 2]

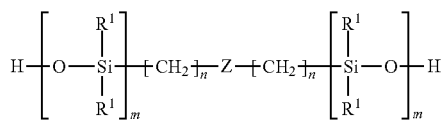

(2)

wherein $R^1$, n, and m are the same as defined above, and Z represents a polyoxyalkylene polymer as a main chain.

[3]

The polyoxyalkylene compound according to [2], wherein Z in the formula (2) is represented by the following formula (4):

[Chem. 3]

(4)

wherein $R^4$ represents a divalent hydrocarbon group, p represents an integer of 2 or more, and the broken line represents a linking bond.

[4]

The polyoxyalkylene compound according to [3], wherein the polyoxyalkylene polymer as a main chain has a linear structure.

[5]

The polyoxyalkylene compound according to [4], having a number average molecular weight of 200 to 50,000.

[6]

A process for producing the polyoxyalkylene compound according to any one of [1] to [5], including a step of causing a hydrosilylation addition reaction between an organosilane or an organopolysiloxane compound having a hydrogen atom bonded to a silicon atom (Si—H group) at one molecular chain terminal and having a hydroxy group bonded to a silicon atom (silanol group) at the other terminal and a polyoxyalkylene polymer having both molecular chain terminals blocked with alkenyl groups.

[7]

The process for producing a polyoxyalkylene compound according to [6], wherein the organosilane or the organopolysiloxane compound having a hydrogen atom bonded to a silicon atom (Si—H group) at one molecular chain terminal and having a hydroxy group bonded to a silicon atom (silanol group) at the other terminal is represented by the following formula (5), and the polyoxyalkylene polymer having both molecular chain terminals blocked with alkenyl groups is represented by the following formula (6):

[Chem. 4]

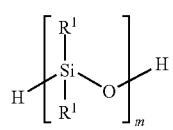

(5)

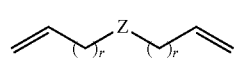

(6)

wherein $R^1$ may be the same or different, and each represents an unsubstituted or substituted monovalent hydrocarbon group having 1 to 20 carbon atoms, a hydrogen atom, or a triorganosiloxy group represented by $(R^3)_3Si$—O— ($R^3$ represents a monovalent hydrocarbon group having 1 to 20 carbon atoms, and three $R^3$s may be the same or different), Z represents a polyoxyalkylene polymer as a main chain, m represents an integer of 1 or more, and r represents an integer of 0 or more.

[8]

The process for producing a polyoxyalkylene compound according to [7], wherein Z in the formula (6) is represented by the following formula (4):

[Chem. 5]

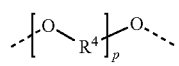

(4)

wherein $R^4$ represents a divalent hydrocarbon group, p represents an integer of 2 or more, and the broken line represents a linking bond.

[9]

A room-temperature-curable composition including:

(a) 100 parts by weight of a polyoxyalkylene compound having at least one reactive silicon group represented by the following structural formula (1) at a molecular chain terminal in one molecule thereof and having a main chain of a polyoxyalkylene polymer:

[Chem. 6]

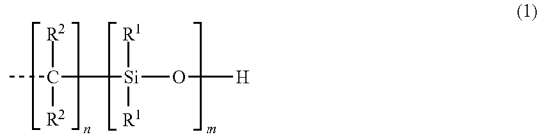
(1)

wherein $R^1$ and $R^2$ may be the same or different, and each represents an unsubstituted or substituted monovalent hydrocarbon group having 1 to 20 carbon atoms, a hydrogen atom, or a triorganosiloxy group represented by $(R^3)_3Si$—O— ($R^3$ represents a monovalent hydrocarbon group having 1 to 20 carbon atoms, and three $R^3$s may be the same or different), n represents an integer of 2 or more, m represents an integer of 1 or more, and the broken line represents a linking bond;

(b) 0.1 to 30 parts by weight of the following component (b-1) and/or component (b-2):

(b-1) a hydrolyzable organosilicon compound having two alkoxysilyl-vinylene groups (alkoxysilyl-ethenylene groups) on the same silicon atom, represented by the following general formula (7), and/or a partial hydrolytic condensate thereof:

[Chem. 7]

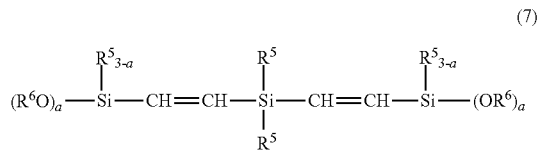
(7)

wherein $R^5$ independently represents an unsubstituted or substituted monovalent hydrocarbon group having 1 to 20 carbon atoms, $R^6$ represents an unsubstituted or substituted alkyl group having 1 to 20 carbon atoms, or an unsubstituted or substituted cycloalkyl group having 3 to 20 carbon atoms, and a represents an integer of 1 to 3;

(b-2) a hydrolyzable organosilane free of an amino group, having one methyl group, one vinyl group, or one phenyl group, and having at least two hydrolyzable groups in one molecule thereof, being other than the component (b-1), and/or a partial hydrolytic condensate thereof; and (c) 0.01 to 20 parts by weight of a curing catalyst.

[10]

The room-temperature-curable composition according to [9], wherein $R^1$ and $R^2$ in the formula (1) may be the same or different, and each represents an alkyl group having 1 to 20 carbon atoms, in which an alkyl group having 3 or more carbon atoms may be a cyclic cycloalkyl group, an aryl group having 6 to 20 carbon atoms, an aralkyl group having 7 to 20 carbon atoms, a hydrogen atom, or a triorganosiloxy group represented by $(R^3)_3Si$—O— ($R^3$ is the same as defined above).

[11]

The room-temperature-curable composition according to [9] or [10], wherein the polyoxyalkylene compound (a) is represented by the following structural formula (2):

[Chem. 8]

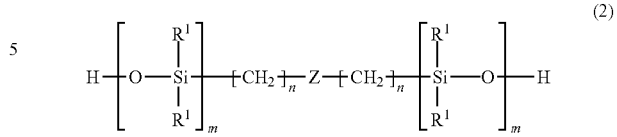
(2)

wherein $R^1$, n, and m are the same as defined above, and Z represents a polyoxyalkylene polymer as a main chain.

[12]

The room-temperature-curable composition according to [11], wherein Z in the formula (2) is represented by the following formula (4):

[Chem. 9]

(4)

wherein $R^4$ represents a divalent hydrocarbon group, p represents an integer of 2 or more, and the broken line represents a linking bond.

[13]

The room-temperature-curable composition according to any one of [9] to [12], wherein the polyoxyalkylene compound (a) has a linear structure.

[14]

The room-temperature-curable composition according to any one of [9] to [13], wherein the polyoxyalkylene compound (a) has a number average molecular weight of 200 to 50,000.

[15]

The room-temperature-curable composition according to any one of [9] to [14], further including:
per 100 parts by weight of the component (a),
(d) 3 to 1,000 parts by weight of a filler; and/or
(e) 0.1 to 30 parts by weight of an adhesion promoter.

[16]

The room-temperature-curable composition according to any one of [9] to [15], further including:
per 100 parts by weight of the component (a),
(f) 0.1 to 100 parts by weight of an organopolysiloxane represented by the following general formula (8):

[Chem. 10]

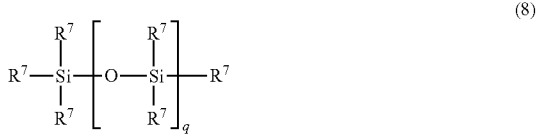
(8)

wherein $R^7$ independently represents an unsubstituted or substituted monovalent hydrocarbon group free of an aliphatic unsaturated bond having 1 to 20 carbon atoms, and q represents such a numerical value that the organopolysiloxane has viscosity of 1.5 to 1,000,000 mPa·s at 23° C.

[17]

A sealing material including the room-temperature-curable composition according to any one of [9] to [16].

[18]

An article bonded and/or sealed with a cured product of the room-temperature-curable composition according to any one of [9] to [16].

By using a novel polyoxyalkylene compound (hereinafter also referred to as "silanol-group-terminated polyoxyalkylene compound") having such a terminal silanol group and having a main chain of a polyoxyalkylene polymer as a main component (base polymer), a room-temperature-curable composition (modified silicone RTV composition) which can use crosslinking components of an oxime type, an amide type, an aminoxy type, an acetic acid type, and an alcohol type can be provided.

Advantageous Effects of Invention

By using the novel silanol-group-terminated polyoxyalkylene compound of the present invention as a main component (base polymer) of a room-temperature-curable composition, various curing agents (for example, an organosilicon compound containing a hydrolyzable group such as oxime, amide, aminoxy, acetic acid (acetoxy group), or alcohol (alkoxy group)) can be used as a crosslinking component, and a room-temperature-curable composition (particularly a modified silicone RTV composition) utilizing various properties can be provided. This makes it possible to supply a room-temperature-curable composition having excellent curability, and to put the room-temperature-curable composition to wide use for a sealant exhibiting properties of various types of crosslinking components.

DESCRIPTION OF EMBODIMENTS

Hereinafter, the present invention is described in more detail.
<Silanol-Group-Terminated Polyoxyalkylene Compound>

A silanol-group-terminated polyoxyalkylene compound of the present invention is a novel polyoxyalkylene compound having at least one, preferably two or more silanol group-containing reactive silicon groups represented by the following structural formula (1) at a molecular chain terminal (particularly at both molecular chain terminals) in one molecule thereof as a partial structure and having a main chain of a polyoxyalkylene polymer:

[Chem. 11]

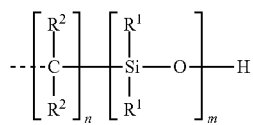

(1)

wherein $R^1$ and $R^2$ may be the same or different, and each represents an unsubstituted or substituted monovalent hydrocarbon group having 1 to 20 carbon atoms, a hydrogen atom, or a triorganosiloxy group represented by $(R^3)_3Si-O-$ ($R^3$ represents a monovalent hydrocarbon group having 1 to 20 carbon atoms, and three $R^3$s may be the same or different), n represents an integer of 2 or more, m represents an integer of 1 or more, and the broken line represents a linking bond.

If the number of the silanol group-containing reactive silicon groups represented by the structural formula (1) contained in one molecule is less than 1 on average, curability of a composition containing the reactive silicon groups as a main component is insufficient. If the number of the reactive silicon groups is too large, a network structure is too dense, and therefore there is a possibility that an obtained cured product does not exhibit favorable mechanical properties. Therefore, the number of the silanol group-containing reactive silicon groups contained in one molecule is 1 or more, preferably 1.1 to 5, more preferably 2 to 4, and still more preferably 2 (for example, one at each molecular chain terminal).

In the formula (1), $R^1$ and $R^2$ may be the same or different from each other, and each represents an unsubstituted or substituted monovalent hydrocarbon group having 1 to 20 carbon atoms, a hydrogen atom, or a triorganosiloxy group represented by $(R^3)_3Si-O-$ ($R^3$ represents a monovalent hydrocarbon group having 1 to 20 carbon atoms, and three $R^3$s may be the same or different from one another). The unsubstituted or substituted monovalent hydrocarbon group of each of $R^1$ and $R^2$ has the carbon number of 1 to 20, preferably of 1 to 10, more preferably of about 1 to 8. $R^1$ and $R^2$ may be the same or different from each other, and each preferably represents an alkyl group having 1 to 20 to carbon atoms, a cycloalkyl group having 3 to 20 carbon atoms, an alkenyl group having 2 to 20 carbon atoms, an aryl group having 6 to 20 carbon atoms, or an aralkyl group having 7 to 20 carbon atoms. The carbon number of each of these groups is more preferably 1 to 10, and particularly preferably 1 to 8. The monovalent hydrocarbon group of $R^3$ has the carbon number of 1 to 20, preferably of 1 to 10, more preferably of about 1 to 8. $R^3$ may be the same or different from each other, and each preferably represents an alkyl group having 1 to 20 carbon atoms, a cycloalkyl group having 3 to 20 carbon atoms, an alkenyl group having 2 to 20 carbon atoms, an aryl group having 6 to 20 carbon atoms, or an aralkyl group having 7 to 20 carbon atoms. The carbon number of each of these groups is more preferably 1 to 10, and particularly preferably 1 to 8.

Specific examples of $R^1$ and $R^2$ include: an alkyl group such as a methyl group, an ethyl group, a n-propyl group, an isopropyl group, a n-butyl group, an isobutyl group, a tert-butyl group, a pentyl group, a neopentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, or an eicosyl group; a cycloalkyl group such as a cyclopentyl group or a cyclohexyl group; an alkenyl group such as a vinyl group, an allyl group, a propenyl group, an isopropenyl group, a butenyl group, a pentenyl group, or a hexenyl group; an aryl group such as a phenyl group, a tolyl group, a xylyl group, or an α-, β-naphthyl group; an aralkyl group such as a benzyl group, a 2-phenylethyl group, or a 3-phenylpropyl group; a group obtained by replacing a part or all of hydrogen atoms in these groups with a halogen atom such as F, Cl, or Br, a cyano group, or the like, for example, a 3-chloropropyl group, a 3,3,3-trifluoropropyl group, or a 2-cyanoethyl group; a hydrogen atom; and a triorganosiloxy group such as a trimethylsiloxy group, a triethylsiloxy group, or a triphenylsiloxy group.

Among these groups, $R^1$ is preferably a methyl group, an ethyl group, or a phenyl group, and particularly preferably a methyl group or a phenyl group from viewpoints of easy availability, productivity, and cost. $R^2$ is preferably a hydrogen atom.

As $R^3$, groups similar to the groups exemplified for the monovalent hydrocarbon group of $R^1$ and $R^2$ can be exemplified. $R^3$ is preferably a methyl group, an ethyl group, or a phenyl group.

In the formula (1), n represents an integer of 2 or more, m represents an integer of 1 or more, n preferably represents an integer of 2 to 8, m preferably represents an integer of 1 to 8, n more preferably represents an integer of 2 to 4, and m more preferably represents an integer of 2 to 4.

A main chain skeleton of the silanol-group-terminated polyoxyalkylene compound preferably has a repeating unit (for example, an oxyalkylene group) represented by the following formula (3):

wherein $R^4$ represents a divalent hydrocarbon group.

The $R^4$ is not particularly limited as long as being a divalent hydrocarbon group (particularly an aliphatic divalent hydrocarbon group), but a linear or branched alkylene group having 1 to 14 carbon atoms is preferable. The $R^4$ is more preferably a linear or branched alkylene group having 2 to 4 carbon atoms.

The repeating unit represented by the formula (3) is not particularly limited, and examples thereof include an oxyalkylene group such as —$CH_2O$—, —$CH_2CH_2O$—, —$CH_2CH_2CH_2O$—, —$CH_2CH(CH_3)O$—, —$CH_2CH(CH_2CH_3)O$—, —$CH_2C(CH_3)_2O$—, or $CH_2CH_2CH_2CH_2O$—.

The main chain skeleton of the polyoxyalkylene compound may be formed of one kind or two or more kinds selected from the repeating units represented by the formula (3). Particularly, in a case where the polyoxyalkylene compound is used for a sealant or the like, a polymer mainly containing propylene oxide (—$CH_2CH(CH_3)O$—) is preferable.

The silanol-group-terminated polyoxyalkylene compound of the present invention has viscosity at 25° C. preferably of 10 to 100,000 mPa·s, more preferably of 50 to 50,000 mPa·s, particularly preferably of 100 to 10,000 mPa·s. If the viscosity of the silanol-group-terminated polyoxyalkylene compound is 10 mPa·s or more, it is easy to obtain a coating film having excellent physical/mechanical strength. The viscosity of the silanol-group-terminated polyoxyalkylene compound of 100,000 mPa·s or less is preferable because a composition does not have too high viscosity and have good workability at the time of use. Here, the viscosity is a numerical value according to a rotational viscometer (for example, a BL type, a BH type, a BS type, a cone plate type, or a rheometer, the same below).

Note that the silanol-group-terminated polyoxyalkylene compound may be linear or branched, but is preferably linear. The silanol-group-terminated polyoxyalkylene compound has a molecular weight usually of 200 to 50,000, preferably of 800 to 40,000, more preferably of 1,000 to 30,000, still more preferably of 2,000 to 20,000, particularly preferably of 3,000 to 15,000, most preferably of about 4,000 to 10,000.

Here, the molecular weight or degree of polymerization (repeating number of an oxyalkylene unit) can be determined, for example, by regarding the molecular weight or degree of polymerization as a number average molecular weight (or number average degree of polymerization) or the like in terms of polystyrene in gel permeation chromatography (GPC) analysis using tetrahydrofuran (THF) or the like as a developing solvent.

Incidentally, in the present invention, the "linear" of the silanol-group-terminated polyoxyalkylene compound means that divalent oxyalkylene groups which are repeating units constituting the polyoxyalkylene structure are linearly connected to each other, and each of the oxyalkylene groups itself may be linear or branched (for example, a propyleneoxy group such as —$CH_2CH(CH_3)O$—.

Examples of such a silanol-group-terminated polyoxyalkylene compound include a compound represented by the following structural formula (2):

[Chem. 12]

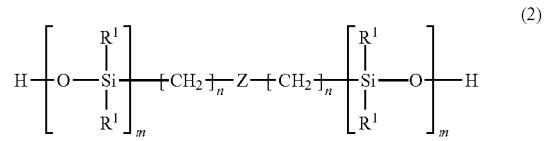

wherein $R^1$, n, and m are the same as defined above, and Z represents a polyoxyalkylene polymer as a main chain.

In the formula (2), Z has the above-described repeating unit represented by the formula (3), and examples thereof include a compound represented by the following formula (4):

[Chem. 13]

wherein $R^4$ is the same as defined above, preferably a linear or branched alkylene group having 1 to 14 carbon atoms, more preferably a linear or branched alkylene group having 2 to 4 carbon atoms, p represents an integer of 2 or more, preferably an integer of 10 to 700, more preferably an integer of 20 to 500, still more preferably an integer of 50 to 200, and the broken line represents a linking bond.

Examples of the silanol-group-terminated polyoxyalkylene compound represented by the formula (2) include the following compounds:

[Chem. 14]

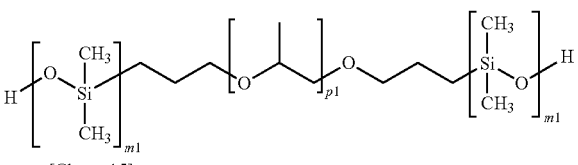

[Chem. 15]

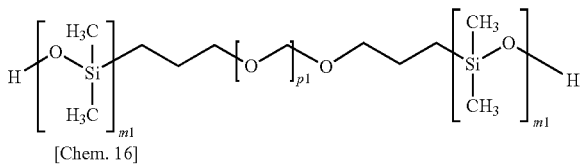

[Chem. 16]

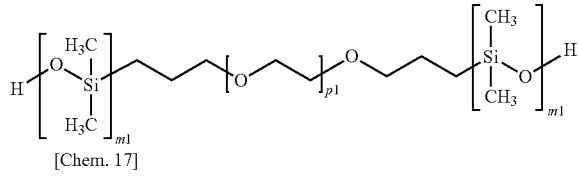

[Chem. 17]

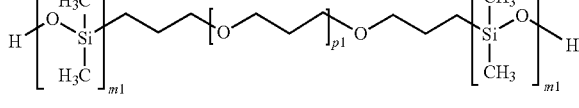

-continued

[Chem. 18]

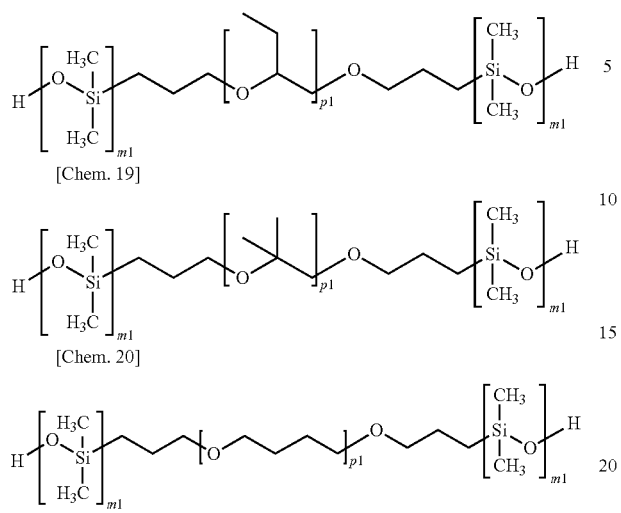

[Chem. 19]

[Chem. 20]

wherein p1 is the same as p, and m1 is the same as m.

The above silanol-group-terminated polyoxyalkylene compound may be used singly or in combination of two or more kinds thereof.

<Process for Producing Silanol-Group-Terminated Polyoxyalkylene Compound>

The novel silanol-group-terminated polyoxyalkylene compound according to an embodiment of the present invention can be easily produced, for example, by causing a hydrosilylation addition reaction between an organosilane or an organopolysiloxane compound (silicon compound) having a hydrogen atom bonded to a silicon atom (Si—H group) at one molecular chain terminal and having a hydroxy group bonded to a silicon atom (silanol group) at the other terminal, represented by the following formula (5), and a polyoxyalkylene polymer having both molecular chain terminals blocked with alkenyl groups, represented by the following formula (6):

[Chem. 21]

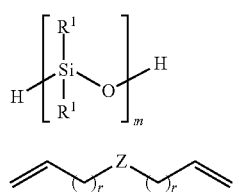

(5)

(6)

wherein $R^1$, Z, and m are the same as defined above, r represents an integer of 0 or more, preferably an integer of 0 to 8, and more preferably an integer of 0 to 2.

Specific examples of the silicon compound represented by the formula (5) include compounds represented by the following structural formulae (here, Ph represents a phenyl group), but are not limited thereto. Any silicon compound having a Si—H group at one molecular chain terminal and having a Si—OH group at the other molecular chain terminal can be used.

[Chem. 22]

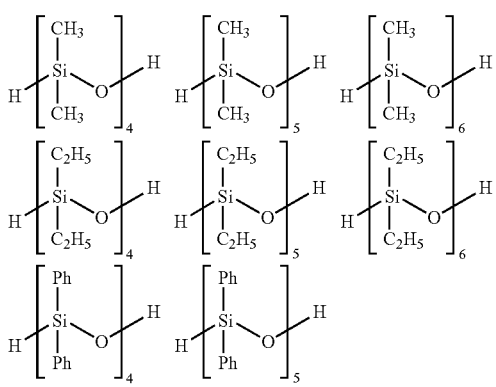

Specific examples of the polyoxyalkylene polymer having both molecular chain terminals blocked with alkenyl groups, represented by the formula (6), include compounds represented by the following structural formulae (here, p is the same as defined above), but are not limited thereto. Any polyoxyalkylene polymer having both terminals blocked with alkenyl groups can be used.

[Chem. 23]

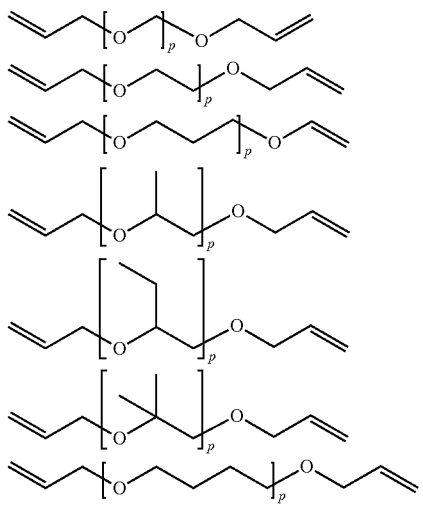

The polyoxyalkylene polymer represented by the formula (6) only needs to have a molecular weight (particularly a number average molecular weight) usually of 150 to 49,000, preferably of 700 to 39,000, more preferably of 900 to 29,000, still more preferably of 1,500 to 19,000, particularly preferably of 2,500 to 14,000, most preferably of about 3,500 to 9,500. If the molecular weight of the polyoxyalkylene polymer represented by formula (6) is too small, physical properties of a cured product after curing is insufficient. If the molecular weight is too large, not only the viscosity is extremely high to deteriorate workability, but also curability of the cured product may be lowered.

A reaction ratio between the silicon compound represented by the formula (5) and the polyoxyalkylene polymer represented by the formula (6) is preferably 0.8 to 1.5 (mol/mol), and particularly preferably about 0.9 to 1.1 (mol/mol) in terms of a molar ratio of a Si—H group in the silicon compound represented by formula (5) with respect to an alkenyl group in the polyoxyalkylene polymer represented by formula (6). If the molar ratio is too small, a cured product after curing is not be completely cured, and rubber properties are not sufficiently obtained in some cases. If the molar ratio is too large, rubber strength after curing is lowered to make it difficult to obtain rubber elasticity, and this may be disadvantageous also in cost.

Examples of an addition reaction catalyst used for adding the silicon compound include a platinum group metal-based catalyst such as a platinum-based catalyst, a palladium-based catalyst, a rhodium-based catalyst, or a ruthenium-based catalyst, and a platinum-based catalyst is particularly preferable. Examples of the platinum-based catalyst include platinum black, a catalyst in which solid platinum is carried on a carrier such as alumina or silica, chloroplatinic acid, alcohol-modified chloroplatinic acid, a complex of chloroplatinic acid and an olefin, and a complex of platinum and vinyl siloxane.

The use amount of the platinum group metal-based catalyst only needs to be a so-called catalytic amount. For example, with respect to the total weight of the silicon compound represented by the formula (5) and the polyoxyalkylene polymer represented by the formula (6), the platinum group metal-based catalyst is used in an amount preferably of 0.1 to 1,000 ppm, particularly preferably of 0.5 to 100 ppm in terms of the weight of a platinum group metal.

This reaction is desirably performed at a temperature of 50 to 120° C., particularly at a temperature of 60 to 100° C., for 0.5 to 12 hours, particularly for 1 to 6 hours, and can be performed without using a solvent. However, an appropriate solvent such as toluene or xylene may be used as necessary as long as not adversely affecting the addition reaction or the like.

This reaction is represented by the following formula [1], for example, in a case where polypropylene having both molecular chain terminals blocked with allyl groups is used as an alkenyl group-blocked polyoxyalkylene polymer.

[Chem. 24]

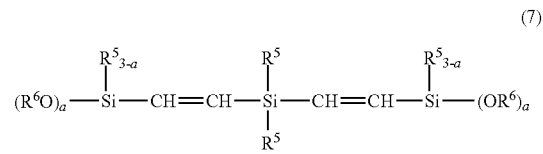

wherein $R^1$ is the same as defined above, and p2 and m2 each represents an integer of 1 or more.

The polyoxyalkylene compound of the present invention can be used as a main component (base polymer) of a room-temperature-curable composition using a crosslinking agent component such as an oxime type, an amide type, an aminoxy type, an acetic acid type, or an alcohol type. The composition has excellent curability, and can be preferably used as a sealing material, a one-liquid type adhesive, a pressure-sensitive adhesive, a paint, a coating material, a filling material, a casting material, a covering material, or the like.

<Room-Temperature-Curable Composition>

The room-temperature-curable composition of the present invention comprises the polyoxyalkylene compound as a main component, and preferably comprises the following components:

(a) the polyoxyalkylene compound;
(b) the following component (b-1) and/or component (b-2):

(b-1) a hydrolyzable organosilicon compound having two alkoxysilyl-vinylene groups on the same silicon atom, represented by the following general formula (7), and/or a partial hydrolytic condensate thereof:

[Chem. 25]

$$(R^6O)_a-\underset{R^5}{\underset{|}{\overset{R^5_{3-a}}{\overset{|}{Si}}}}-CH=CH-\underset{R^5}{\underset{|}{\overset{R^5}{\overset{|}{Si}}}}-CH=CH-\underset{}{\overset{R^5_{3-a}}{\overset{|}{Si}}}-(OR^6)_a \quad (7)$$

wherein $R^5$ independently represents an unsubstituted or substituted monovalent hydrocarbon group having 1 to 20 carbon atoms, $R^6$ represents an unsubstituted or substituted alkyl group having 1 to 20 carbon atoms, or an unsubstituted or substituted cycloalkyl group having 3 to 20 carbon atoms, and a represents an integer of 1 to 3;

(b-2) a hydrolyzable organosilane free of an amino group, having one methyl group, one vinyl group, or one phenyl group, and having at least two hydrolyzable groups in one molecule thereof, being other than the component (b-1), and/or a partial hydrolytic condensate thereof; and (c) a curing catalyst.

Component (a): Silanol-Group-Terminated Polyoxyalkylene Compound

The component (a) is a main component (base polymer) of the room-temperature-curable composition of the present invention. The above-described polyoxyalkylene compound can be used as the component (a). Among the polyoxyalkylene compounds, the component (a) is preferably a silanol-group-terminated polyoxyalkylene compound free of an aliphatic unsaturated bond.

That is, in the formula (1), $R^1$ and $R^2$ may be the same or different from each other, and each represents an alkyl group having 1 to 20 carbon atoms, in which an alkyl group having 3 or more carbon atoms may be a cyclic cycloalkyl group, an aryl group having 6 to 20 carbon atoms, an aralkyl group having 7 to 20 carbon atoms, a hydrogen atom, or a triorganosiloxy group represented by $(R^3)_3Si-O-$ ($R^3$ is the same as defined above). Among these groups, $R^1$ is preferably a methyl group, an ethyl group, or a phenyl group, and particularly preferably a methyl group or a phenyl group from viewpoints of easy availability, productivity, and cost, $R^2$ is preferably a hydrogen atom, and $R^3$ is preferably a group free of an aliphatic unsaturated bond, and more preferably a methyl group, an ethyl to group, or a phenyl group.

Examples of such a silanol-group-terminated polyoxyalkylene compound include a compound free of an aliphatic unsaturated bond among the above-described polyoxyalkylene compounds.

Component (b): Hydrolyzable Organosilane and/or Partial Hydrolytic Condensate Thereof The component (b) according to the present invention acts as a curing agent (crosslinking agent) component in the room-temperature-curable composition of the present invention, and includes the following component (b-1) and/or component (b-2). Unless the room-temperature-curable composition of the present invention includes at least one of the component (b-1) and the component (b-2), an excellent cured product cannot be obtained.

The component (b-1) is a hydrolyzable organosilicon compound (hydrolyzable organosilane) having two alkoxysilyl-vinylene groups (alkoxysilyl-ethenylene groups) on the same silicon atom represented by the following general formula (7) and/or a partial hydrolytic condensate thereof. Incidentally, in the present invention, the partial hydrolytic condensate refers to an organosiloxane oligomer having at least 2, preferably 3 or more residual hydrolyzable groups in a molecule thereof, produced by partially hydrolyzing and condensing the hydrolyzable organosilane.

[Chem. 26]

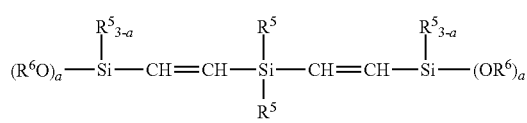

(7)

wherein $R^5$ independently represents an unsubstituted or substituted monovalent hydrocarbon group having 1 to 20 carbon atoms, $R^6$ represents an unsubstituted or substituted alkyl group having 1 to 20 carbon atoms, or an unsubstituted or substituted cycloalkyl group having 3 to 20 carbon atoms, and a represents an integer of 1 to 3.

Here, in the formula (7), the unsubstituted or substituted monovalent hydrocarbon group of $R^5$ has 1 to 20 carbon atoms, preferably 1 to 10 carbon atoms, and more preferably about 1 to 8 carbon atoms. $R^5$ may be the same or different from each other. Examples thereof include an alkyl group such as a methyl group, an ethyl group, a n-propyl group, an isopropyl group, a n-butyl group, an isobutyl group, a tert-butyl group, a pentyl group, a neopentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, or an eicosyl group; a cycloalkyl group such as a cyclopentyl group or a cyclohexyl group; an aryl group such as a phenyl group, a tolyl group, a xylyl group, or an α-, β-naphthyl group; an aralkyl group such as a benzyl group, a 2-phenylethyl group, or a 3-phenylpropyl group; and a group obtained by replacing a part or all of hydrogen atoms in these groups with a halogen atom such as F, Cl, or Br, a cyano group, or the like, for example, a 3-chloropropyl group, a 3,3,3-trifluoropropyl group, or a 2-cyanoethyl group. Among these groups, a methyl group, an ethyl group, and a phenyl group are preferable, and a methyl group and a phenyl group are particularly preferable from viewpoints of easy availability, productivity, and cost.

The unsubstituted alkyl group of $R^6$ has 1 to 20 carbon atoms, preferably 1 to 6 carbon atoms, and more preferably about 1 to 4 carbon atoms, and examples thereof include a methyl group, an ethyl group, a n-propyl group, an isopropyl group, a n-butyl group, an isobutyl group, a tert-butyl group, a pentyl group, a neopentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group. The unsubstituted cycloalkyl group has 3 to 20 carbon atoms, preferably 4 to 8 carbon atoms, and more preferably about 5 or 6 carbon atoms, and examples thereof include a cyclopentyl group and a cyclohexyl group. A part or all of hydrogen atoms of the alkyl group or the cycloalkyl group may be replaced with a halogen atom such as F, Cl, or Br, a cyano group, or the like, and examples thereof include a 3-chloropropyl group, a 3,3,3-trifluoropropyl group, and a 2-cyanoethyl group. Among these groups, $R^6$ is preferably a methyl group or an ethyl group, and particularly preferably a methyl group from a viewpoint of hydrolyzability or the like.

The hydrolyzable organosilicon compound represented by the general formula (7) as the component (b-1) is mainly used as a curing agent. In general formula (7), a independently represent an integer of 1 to 3 for each silicon atom, but preferably represent 2 or 3 from a viewpoint of curability. Particularly, a compound having three alkoxy groups such as methoxy groups (that is, a compound having six alkoxy groups in total in a molecule) as two alkoxysilyl-vinylene groups on the same silicon atom in a molecule has two trifunctional alkoxyalkoxysilane moieties in one molecule, and therefore is useful as a curing agent (crosslinking agent) of a dealcoholated type modified silicone (room-temperature-curable composition).

A synthesis example of the component (b-1) is described below.

<Production of Hydrolyzable Organosilicon Compound Having Two Alkoxysilyl-Vinylene Groups on the Same Silicon Atom>

A hydrolyzable organosilicon compound having two alkoxysilyl-vinylene groups (alkoxysilyl-ethenylene groups) on the same silicon atom as the component (b-1) can be easily produced, for example, through an addition reaction caused by a hydrosilylation reaction between an organosilane having two ethynyl groups on the same silicon atom and two alkoxyhydrosilanes. This reaction formula is represented, for example, by the following formula [2].

[Chem. 27]

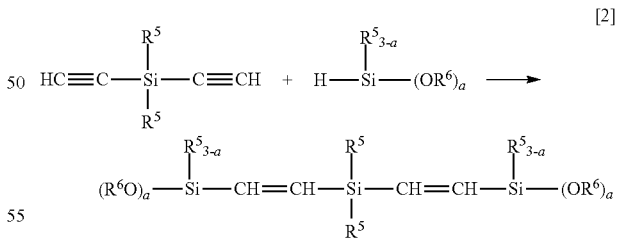

[2]

wherein $R^5$, $R^6$, and a are the same as defined in the general formula (7).

Examples of an addition reaction catalyst used for adding an alkoxyhydrosilane include a platinum group metal-based catalyst such as a platinum-based catalyst, a palladium-based catalyst, a rhodium-based catalyst, or a ruthenium-based catalyst, and a platinum-based catalyst is particularly preferable. Examples of the platinum-based catalyst include platinum black, a catalyst in which solid platinum is carried on a carrier such as alumina or silica, chloroplatinic acid, alcohol-modified chloroplatinic acid, a complex of chloroplatinic acid and an olefin, and a complex of platinum and vinyl siloxane. The use amount of the platinum only needs to be a so-called catalytic amount. For example, with respect to the total weight of silanes (the total weight of an organosilane having two ethynyl groups on the same silicon atom and an alkoxyhydrosilane), platinum can be used in an amount of 0.1 to 1,000 ppm, particularly of 0.5 to 100 ppm in terms of the weight of a platinum group metal.

This reaction is desirably performed generally at a temperature of 50 to 120° C., particularly at a temperature of 60 to 100° C., for 0.5 to 12 hours, particularly for 1 to 6 hours, and can be performed without using a solvent. However, an appropriate solvent such as toluene or xylene can be used as necessary as long as not adversely affecting the addition reaction or the like.

Through the addition reaction of an alkoxyhydrosilane to an acetylene group (ethynyl group), for example, geometric isomers (that is, a mixture of an E-isomer and a Z-isomer) are generated as illustrated by the following reaction formula [3]. In this case, the E-isomer (trans-isomer) is generated in higher selectivity and is an active species having higher reactivity. However, for the alkoxysilyl-vinylene group-containing hydrolyzable organosilane as the component (b-1) of the present invention, a mixture of the geometric isomers can be used as it is without separating the geometric isomers because even coexistence of a small amount of the Z-isomer (cis-isomer) does not adversely affect properties of the alkoxysilyl-vinylene group-containing hydrolyzable organosilane.

[Chem. 28]

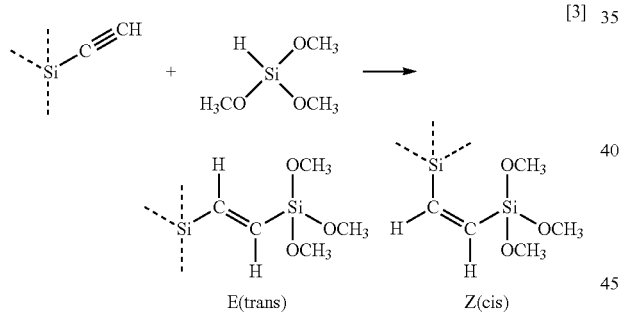

[3]

wherein a broken line represents a linking bond.

Specific examples of the hydrolyzable organosilicon compound having two alkoxysilyl-vinylene groups on the same silicon atom represented by the formula (7) include compounds represented by the following structural formulae. The component (b-1) can be used singly or in combination of two or more kinds thereof.

[Chem. 29]

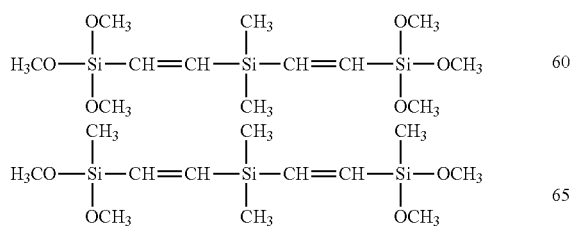

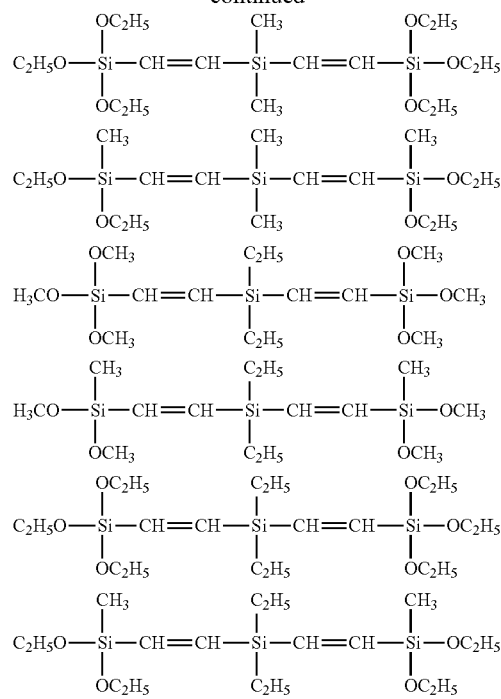

[Chem. 30]

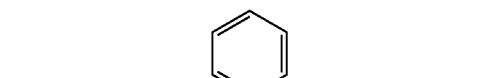

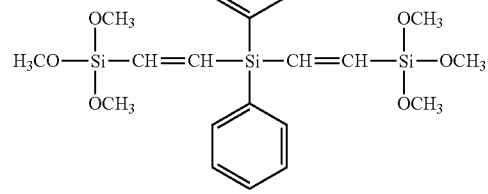

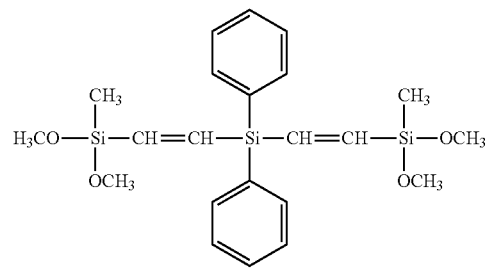

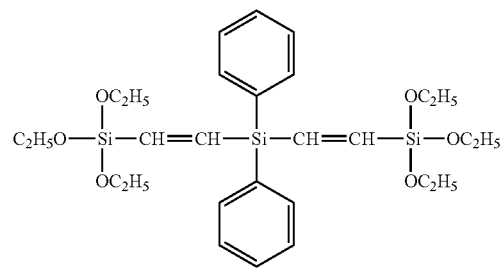

-continued

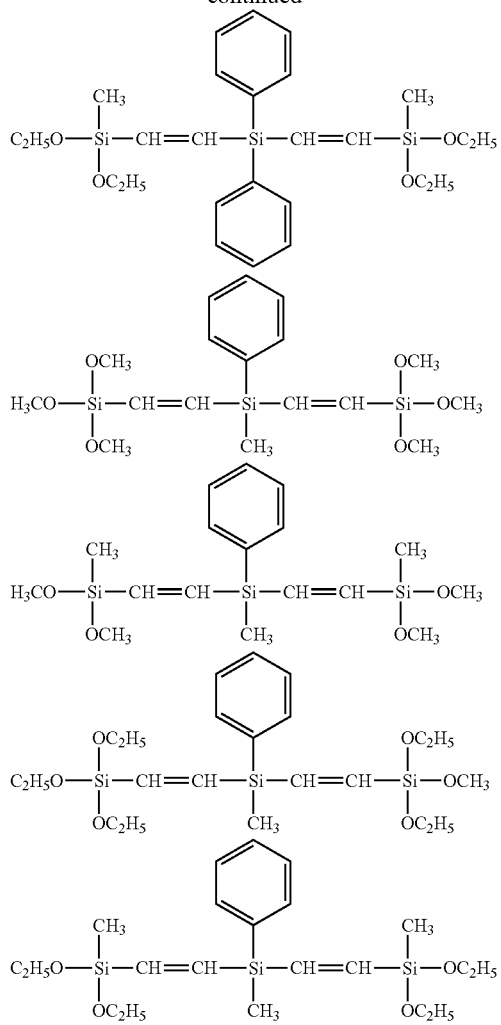

The component (b-2) is a hydrolyzable organosilane free of an amino group, having one methyl group, one vinyl group, or one phenyl group, and having at least two, preferably three hydrolyzable groups in one molecule thereof, being other than the component (b-1), and/or a partial hydrolytic condensate thereof, and is used as a crosslinking agent.

Here, examples of the hydrolyzable group include: an alkoxy group having 1 to 20 carbon atoms, preferably 1 to 10 carbon atoms, more preferably 1 to 4 carbon atoms, such as a methoxy group, an ethoxy group, a propoxy group, an isopropoxy group, a butoxy group, an isobutoxy group, or a tert-butoxy group; an alkoxyalkoxy group having 2 to 40 carbon atoms, preferably 2 to 10 carbon atoms, more preferably 2 to 4 carbon atoms, such as a methoxymethoxy group or a methoxyethoxy group; an alkenyloxy group having 2 to 20 carbon atoms, preferably 2 to 10 carbon atoms, more preferably 2 to 5 carbon atoms, such as a vinyloxy group, an allyloxy group, a propenoxy group, or an isopropenoxy group; a ketoxime group having 3 to 20 carbon atoms, preferably 3 to 10 carbon atoms, more preferably 3 to 6 carbon atoms, such as a dimethylketoxime group, a diethylketoxime group, or a methylethylketoxime group; and an acyloxy group having 2 to 20 carbon atoms, preferably 2 to 10 carbon atoms, more preferably 2 to 5 carbon atoms, such as an acetoxy group.

Specific examples of the component (b-2) include methyltrimethoxysilane, methyltriethoxysilane, vinyltrimethoxysilane, vinyltriethoxysilane, vinyltriisopropoxysilane, methyltris(methoxyethoxy) silane, vinyltris(methoxyethoxy) silane, methyltripropenoxysilane, vinyltriisopropenoxysilane, phenyltriisopropenoxysilane, methyltriacetoxysilane, vinyltriacetoxysilane, and partial hydrolytic condensates thereof, but the component (b-2) is not limited thereto. These compounds can be used singly or in combination of two or more kinds thereof.

A hydrolyzable organosilicon compound and/or a partial hydrolytic condensate thereof as the component (b) (that is, the total amount of the components (b-1) and (b-2)) is used in an amount of 0.1 to 30 parts by weight, preferably of 0.5 to 20 parts by weight, more preferably of 3 to 15 parts by weight per 100 parts by weight of the polyoxyalkylene polymer as the component (a). If the use amount is less than 0.1 parts by weight, sufficient crosslinking cannot be obtained, and it is difficult to obtain a composition having desired rubber elasticity. If the use amount exceeds 30 parts by weight, mechanical properties of rubber properties are lowered, and a problem of further causing an economic disadvantage occurs.

Incidentally, as the component (b) which is a curing agent (crosslinking agent) in the room-temperature-curable composition of the present invention, the component (b-1) and the component (b-2) may be used singly or in combination thereof. In a case where the component (b-1) and the component (b-2) are used in combination, a use weight ratio of the component (b-1): the component (b-2) can be 99:1 to 1:99, preferably 90:10 to 10:90, more preferably 70:30 to 30:70, and still more preferably about 60:40 to 40:60.

Component (c): Curing Catalyst (Nonmetallic Organic Catalyst and/or Metallic Catalyst)

The component (c) is a curing catalyst (nonmetallic organic catalyst and/or metallic catalyst) and acts to promote curing of the room-temperature-curable composition of the present invention.

As the nonmetallic organic catalyst of the curing catalyst, a known curing promoter for a condensation-curable organopolysiloxane composition can be used, and the nonmetallic organic catalyst is not particularly limited. Examples of the nonmetallic organic catalyst include: a phosphazene-containing compound such as N,N,N',N',N",N"-hexamethyl-N'''-(trimethylsilylmethyl)-phosphorimidic triamide; an aminoalkyl group-substituted alkoxysilane such as 3-aminopropyltriethoxysilane or N-β (aminoethyl) γ-aminopropyltrimethoxysilane; an amine compound such as hexylamine or dodecylamine phosphate and salts thereof; a quaternary ammonium salt such as benzyltriethylammonium acetate; a dialkylhydroxylamine such as dimethylhydroxylamine or diethylhydroxylamine; a guanidyl group-containing silane such as tetramethylguanidylpropyl trimethoxysilane, tetramethylguanidylpropylmethyl dimethoxysilane, or tetramethylguanidylpropyl tris(trimethylsiloxy) silane; and a siloxane. However, the nonmetallic organic catalyst is not limited thereto. The nonmetallic organic catalyst may be used singly or in combination of two or more kinds thereof.

As the metallic catalyst of the curing catalyst, a known curing promoter for a condensation-curable organopolysiloxane can be used, and the metallic catalyst is not particularly limited. Examples of the metallic catalyst include: an alkyl tin ester compound such as dibutyl tin diacetate, dibutyl tin dilaurate, dibutyl tin dioctoate, dioctyl tin dinedodecanoate, or di-n-butyl-dimethoxy tin; a titanate or a titanium chelate compound such as tetraisopropoxy titanium, tetra-n-butoxy titanium, tetrakis(2-ethylhexoxy) titanium, dipropoxybis(acetylacetonato) titanium, or titanium isopropoxy octylene glycol; zinc naphthenate; zinc stearate; zinc-2-ethyl octoate; iron-2-ethylhexoate; cobalt-2-ethylhexoate; manganese-2-ethylhexoate; cobalt naphthenate; an alcoholate aluminum compound such as aluminum isopropylate or aluminum secondary butyrate; an aluminum chelate compound such as aluminum alkyl acetate-diisopropylate or aluminum bisethyl acetoacetate-monoacetylacetonate; an organometallic compound such as bismuth(III) neodecanoate, bismuth(III) 2-ethylhexanoate, bismuth(III) citrate, or bismuth octylate; and a lower fatty acid salt of an alkali metal such as potassium acetate, sodium acetate, or lithium oxalate. However, the metallic catalyst is not limited thereto. The metallic catalyst may be used singly or in combination of two or more kinds thereof.

The use amount of the curing catalyst only needs to be a small catalyst amount. The blending amount of the component (c) is 0.01 to 20 parts by weight, particularly preferably 0.05 to 10 parts by weight, and more preferably 0.05 to 5 parts by weight per 100 parts by weight of the component (a). If the use amount is less than 0.01 parts by weight, favorable curability cannot be obtained, and therefore a curing rate is small disadvantageously. On the other hand, if the use amount exceeds 20 parts by weight, the curability of the composition is too large, and therefore an allowable range of working time after application of the composition may be shortened, or mechanical properties of an obtained rubber may be lowered.

Component (d): Filler

The component (d) is a filler (an inorganic filler and/or an organic resin filler), is an optional component that can be blended in the room-temperature-curable composition of the present invention as necessary, and is used in order to impart sufficient mechanical strength to a cured product formed from this composition. As the filler, a known filler can be used. Examples thereof include: finely powdered silica; fumed silica; precipitated silica; silica obtained by subjecting surfaces of the silica to a hydrophobic treatment with an organosilicon compound; a glass bead; a glass balloon; a transparent resin bead; silica aerogel; diatomaceous earth; a metal oxide such as iron oxide, zinc oxide, titanium oxide, or a fumed metal oxide; wet silica; products obtained by subjecting surfaces of these materials to a silane treatment; quartz powder, carbon black; talc; a reinforcing agent such as zeolite or bentonite; asbestos; a glass fiber; a carbon fiber; a metal carbonate such as calcium carbonate, magnesium carbonate, or zinc carbonate; glass wool; finely powdered mica; fused silica powder; and synthetic resin powder such as polystyrene, polyvinyl chloride, or polypropylene. Among these fillers, an inorganic filler such as silica, calcium carbonate, or zeolite is preferable, and fumed silica and calcium carbonate having surfaces hydrophobized are particularly preferable.

The blending amount of the component (d) is preferably 0 to 1,000 parts by weight, and more preferably 0 to 300 parts by weight per 100 parts by weight of the component (a). If the component (d) is used in an amount larger than 1,000 parts by weight, the viscosity of a composition increases to deteriorate workability, and in addition, the rubber strength after curing is lowered, and it may be difficult to obtain rubber elasticity. Incidentally, in a case where the component (d) is blended, the blending amount of the component (d) is usually 3 parts by weight or more, and particularly preferably 5 parts by weight or more. By blending the component (d), the mechanical strength of an obtained cured product can be sufficiently high.

Component (e): Adhesion Promoter

The component (e) is an adhesion promoter, is an optional component that can be blended in the room-temperature-curable composition of the present invention as necessary, and is used in order to impart sufficient adhesiveness to a cured product formed from this composition. As the adhesion promoter (a silane coupling agent such as a functional group-containing hydrolyzable silane), a known adhesion promoter is preferably used. Examples of the adhesion promoter include a vinylsilane coupling agent, a (meth) acrylic silane coupling agent, an epoxy silane coupling agent, an aminosilane coupling agent, and a mercaptosilane coupling agent, and specific examples thereof include vinyltris(β-methoxyethoxy) silane, γ-methacryloxypropyltrimethoxysilane, β-(3,4-epoxycyclohexyl) ethyltrimethoxysilane, γ-glycidoxypropyltrimethoxysilane, γ-glycidoxypropylmethyldiethoxysilane, N-β-(aminoethyl)-γ-aminopropyltrimethoxysilane, γ-aminopropyltriethoxysilane, 3-2-(aminoethylamino) propyltrimethoxysilane, γ-mercaptopropyl trimethoxysilane, isocyanate silane, and compounds obtained by partially hydrolyzing and condensing these compounds. Incidentally, among the adhesion promoters, a vinylsilane coupling agent such as vinyltris(β-methoxyethoxy) silane can function also as the component (b-2).

Among these adhesion promoters, an aminosilane such as to γ-aminopropyltriethoxysilane or 3-2-(aminoethylamino) propyltrimethoxysilane; an epoxysilane such as γ-glycidoxypropyltrimethoxysilane or β-(3,4-epoxycyclohexyl) ethyltrimethoxysilane; and isocyanate silane are particularly preferable.

The component (e) is blended in an amount preferably of 0 to 30 parts by weight, particularly preferably of 0.1 to 20 parts by weight per 100 parts by weight of the component (a). In a case where adhesion is performed using a filler or an adherend without using an adhesion promoter, the adhesion promoter does not have to be used.

Component (f): Organopolysiloxane

In addition to the components (a) to (e), the room-temperature-curable composition of the present invention may further contain a linear diorganopolysiloxane (f) represented by the following general formula (8) (so-called non-functional silicone oil):

[Chem. 31]

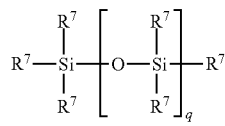

(8)

wherein $R^7$ independently represents an unsubstituted or substituted monovalent hydrocarbon group free of an aliphatic unsaturated bond having 1 to 20 carbon atoms, and q represents such a numerical value that the organopolysiloxane has viscosity of 1.5 to 1,000,000 mPa·s at 23° C.

In the formula (8), the unsubstituted or substituted monovalent hydrocarbon group of $R^7$ free of an aliphatic unsaturated bond has 1 to 20 carbon atoms, preferably 1 to 10 carbon atoms, and more preferably about 1 to 8 carbon atoms. $R^7$ may be the same or different from each other. Examples thereof include an alkyl group such as a methyl group, an ethyl group, a n-propyl group, an isopropyl group, a n-butyl group, an isobutyl group, a tert-butyl group, a pentyl group, a neopentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, or an eicosyl group; a cycloalkyl group such as a cyclopentyl group or a cyclohexyl group; an aryl group such as a phenyl group, a tolyl group, a xylyl group, or an α-, β-naphthyl group; an aralkyl group such as a benzyl group, a 2-phenylethyl group, or a 3-phenylpropyl group; and a group obtained by replacing a part or all of hydrogen atoms in these groups with a halogen atom such as F, Cl, or Br, a cyano group, or the like, for example, a 3-chloropropyl group, a 3,3,3-trifluoropropyl group, or a 2-cyanoethyl group. Among these groups, a methyl group, an ethyl group, and a phenyl group are preferable, and a methyl group and a phenyl group are more preferable from viewpoints of easy availability, productivity, and cost. Particularly, any one of $R^7$ is preferably a methyl group, and a dimethylpolysiloxane having both molecular chain terminals blocked with trimethylsiloxy groups is preferable.

q represents such a numerical value that the viscosity of the diorganopolysiloxane is 1.5 to 1,000,000 mPa·s at 23° C., and preferably 30 to 100,000 mPa·s. Particularly, r represents an integer of 2 or more, preferably an integer of 20 to 2,000.

In a case where the component (f) is blended, the blending amount of the component (f) is preferably 0.1 to 100 parts by weight, and more preferably 10 to 80 parts by weight per 100 parts by weight of the component (a). The amount of the component (f) within the above range is preferable because the viscosity can be adjusted to a viscosity easily handled for construction without impairing mechanical properties and flame retardancy of the room-temperature-curable composition of the present invention.

--Other Components--

In addition to the components (a) to (f), the room-temperature-curable composition of the present invention may contain various other additives as necessary. For example, the room-temperature-curable composition may contain a known additive such as a pigment including carbon black, iron oxide, and titanium oxide, a dye, an anti-aging agent, an antioxidant, an antistatic agent, an adhesion imparting agent, an antiseptic agent, a flame retardancy imparting agent such as zinc carbonate, an antifungal agent, or an antibacterial agent. These other additives only need to be added in amounts not hindering the effect of the present invention.

An organic solvent may be used as necessary for the room-temperature-curable composition of the present invention. Examples of the organic solvent include: an aliphatic hydrocarbon compound such as n-hexane, n-heptane, isooctane, or isododecane; an aromatic hydrocarbon compound such as toluene or xylene; a linear siloxane such as hexamethyldisiloxane, octamethyltrisiloxane, decamethyltetrasiloxane, dodecamethylpentasiloxane, or 2-(trimethylsiloxy)-1,1,1,2,3,3,3-heptamethyltrisiloxane; and a cyclic siloxane such as octamethylcyclopentasiloxane or decamethylcyclopentasiloxane. The amount of the organic solvent only needs to be appropriately adjusted within a range not hindering the effect of the present invention.

The room-temperature-curable composition of the present invention can be obtained by uniformly mixing the components and, in addition, predetermined amounts of the various additives in a dry atmosphere.

Specifically, the room-temperature-curable composition is preferably prepared by uniformly mixing the components (a) to (c) and, as necessary, the components (d) to (f) and various other additives while bubbles are removed under a state where moisture is blocked or under reduced pressure. A mixing apparatus is not particularly limited, but a universal mixing stirrer (manufactured by DALTON Corporation) connected to a vacuum pump, a planetary mixer (manufactured by INOUE MFG. INC.), or the like is preferably used.

The room-temperature-curable composition is cured by being left at room temperature (23° C.±10° C.). As a method for molding the room-temperature-curable composition, a condition for curing the room-temperature-curable composition, and the like, known methods and conditions can be adopted depending on the kind of the composition.

The room-temperature-curable composition of the present invention is easily cured at room temperature (23° C.±10° C.) by being stored, in the absence of moisture, that is, in a sealed container with moisture blocked and by being exposed to moisture in air at the time of use. When the room-temperature-curable composition of the present invention is cured, the room-temperature-curable composition becomes a cured product having excellent flame retardancy, favorable adhesiveness without a primer to glass and coated aluminum, and excellent deformation followability. An obtained cured product has favorable rubber elasticity. Therefore, the cured product is useful as a sealing material used for a building sealing material. A method of using the room-temperature-curable composition of the present invention as a sealing material is not particularly limited as long as being in accordance with a conventionally known method of using a sealing material.

Examples of an article to be bonded and/or sealed with a cured product of the room-temperature-curable composition of the present invention include articles made of glasses, various metals, and the like.

The room-temperature-curable composition of the present invention thus obtained is rapidly cured at room temperature (23° C.±10° C.) due to moisture in air to form a rubber elastic body cured product having excellent heat resistance, weather resistance, and adhesion to various substrates. The room-temperature-curable composition of the present invention particularly has excellent storage stability and curability. For example, even after storage for six months, the room-temperature-curable composition is rapidly cured by being exposed to air to provide a cured product having excellent physical properties as described above. Furthermore, the room-temperature-curable composition does not release a toxic or corrosive gas during curing and does not generate rust on a surface to which this composition has been applied. This composition can be cured and molded to obtain various molded articles.

EXAMPLES

Hereinafter, the present invention is described specifically with reference to Examples and Comparative Examples, but the present invention is not limited to the following Examples. Incidentally, in the following specific examples, "part" means "part by weight", the room temperature is 23° C.±10° C., and the viscosity indicates a value measured by a rotational viscometer at 25° C., and the molecular weight and the degree of polymerization (the repeating number of polyoxyalkylene units) are a number average molecular weight and a number average degree of polymerization in terms of polystyrene in GPC analysis using THF as a developing solvent.

<Synthesis of Silanol-Group-Terminated Polyoxyalkylene Compound>

Example 1

Into a 500 mL four-neck separable flask equipped with a stirrer, a reflux condenser, a thermometer, and a dropping funnel, 500 g of an allyl group-terminated polypropylene glycol corresponding to a molecular weight of 7,400 (0.160 mol in terms of functional group of terminal allyl group) and 1.0 g of a platinum catalyst (a solution of a vinylsiloxane complex of chloroplatinic acid, platinum concentration: 1% by weight) were put, and the temperature was raised to 90° C. while the resulting mixture was heated and stirred.

Subsequently, under stirring, 50 g of 1-hydroxy-octamethyltetrasiloxane (that is, 1-hydroxy-7-hydrogen-1,1,3,3,5,5,7,7-octamethyltetrasiloxane) (the functional group amount of terminal Si—H: 0.167 mol) was added dropwise thereto. At this time, heat was generated, the reaction temperature became 90 to 95° C., and this reaction system was held for six hours. After completion of the reaction, a small excess of 1-hydroxy-octamethyltetrasiloxane was removed under reduced pressure. The temperature was lowered to room temperature. Thereafter, filtration was performed to obtain 520 g of a silanol-group-terminated polypropylene glycol (polymer A) (viscosity: 4.0 Pa·s, molecular weight: 8,000, yield: 95%). This reaction formula is represented by the following formula [4].

[Chem. 32]

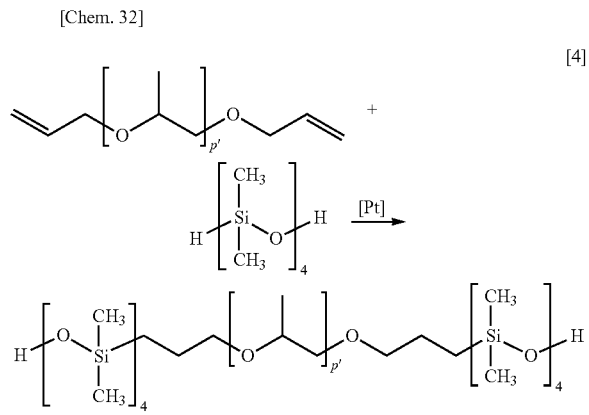

[4]

wherein p' represents 127.

Example 2

Into a 500 mL four-neck separable flask equipped with a stirrer, a reflux condenser, a thermometer, and a dropping funnel, 500 g of an allyl group-terminated polypropylene glycol corresponding to a molecular weight of 8,400 (0.112 mol in terms of functional to group of terminal allyl group) and 1.0 g of a platinum catalyst (a solution of a vinylsiloxane complex of chloroplatinic acid, platinum concentration: 1% by weight) were put, and the temperature was raised to 90° C. while the resulting mixture was heated and stirred.

Subsequently, under stirring, 35 g of 1-hydroxy-octamethyltetrasiloxane (the functional group amount of terminal Si—H: 0.117 mol) was added dropwise thereto. At this time, heat was generated, the reaction temperature became 90 to 95° C., and this reaction system was held for six hours. After completion of the reaction, a small excess of 1-hydroxy-octamethyltetrasiloxane was removed under reduced pressure. The temperature was lowered to room temperature. Thereafter, filtration was performed to obtain 505 g of a silanol-group-terminated polypropylene glycol (polymer B) (viscosity: 10.0 Pa·s, molecular weight: 9,000, yield: 95%).

Example 3

Into a 500 mL four-neck separable flask equipped with a stirrer, a reflux condenser, a thermometer, and a dropping funnel, 250 g of an allyl group-terminated polypropylene glycol corresponding to a molecular weight of 4,300 (0.107 mol in terms of functional group of terminal allyl group) and 1.0 g of a platinum catalyst (a solution of a vinylsiloxane complex of chloroplatinic acid, platinum concentration: 1% by weight) were put, and the temperature was raised to 90° C. while the resulting mixture was heated and stirred.

Subsequently, under stirring, 33 g of 1-hydroxy-octamethyltetrasiloxane (the to functional group amount of terminal Si—H: 0.110 mol) was added dropwise thereto. At this time, heat was generated, the reaction temperature became 90 to 95° C., and this reaction system was held for six hours. After completion of the reaction, a small excess of 1-hydroxy-octamethyltetrasiloxane was removed under reduced pressure. The temperature was lowered to room temperature. Thereafter, filtration was performed to obtain 268 g of a silanol-group-terminated polypropylene glycol (polymer C) (viscosity: 1.3 Pa·s, molecular weight: 4,900, yield: 95%).

Example 4

Into a 500 mL four-neck separable flask equipped with a stirrer, a reflux condenser, a thermometer, and a dropping funnel, 250 g of an allyl group-terminated polypropylene glycol corresponding to a molecular weight of 7,190 (0.063 mol in terms of functional group of terminal allyl group) and 1.0 g of a platinum catalyst (a solution of a vinylsiloxane complex of chloroplatinic acid, platinum concentration: 1% by weight) were put, and the temperature was raised to 90° C. while the resulting mixture was heated and stirred.

Subsequently, under stirring, 19 g of 1-hydroxy-octamethyltetrasiloxane (the functional group amount of terminal Si—H: 0.066 mol) was added dropwise thereto. At this time, heat was generated, the reaction temperature became 90 to 95° C., and this reaction system was held for six hours. After completion of the reaction, a small excess of 1-hydroxy-octamethyltetrasiloxane was removed under reduced pressure. The temperature was lowered to room temperature. Thereafter, filtration was performed to obtain 255 g of a silanol-group-terminated polypropylene glycol (polymer D) (viscosity: 9.2 Pa·s, molecular weight: 7,800, yield: 95%).

Example 5

Into a 500 mL four-neck separable flask equipped with a stirrer, a reflux condenser, a thermometer, and a dropping funnel, 250 g of an allyl group-terminated polypropylene glycol corresponding to a molecular weight of 7,500 (0.048 mol in terms of functional group of terminal allyl group) and 1.0 g of a platinum catalyst (a solution of a vinylsiloxane complex of chloroplatinic acid, platinum concentration: 1% by weight) were put, and the temperature was raised to 90° C. while the resulting mixture was heated and stirred.

Subsequently, under stirring, 15 g of 1-hydroxy-octamethyltetrasiloxane (the functional group amount of terminal Si—H: 0.050 mol) was added dropwise thereto. At this time, heat was generated, the reaction temperature became 90 to 95° C., and this reaction system was held for six hours. After completion of the reaction, a small excess of 1-hydroxyoctamethyltetrasiloxane was removed under reduced pressure. The temperature was lowered to room temperature. Thereafter, filtration was performed to obtain 251 g of a silanol-group-terminated polypropylene glycol (polymer E) (viscosity: 26.5 Pa·s, molecular weight: 8,100, yield: 95%).

Example 6

100 parts of the silanol-group-terminated polypropylene glycol (polymer A) having viscosity of 4.0 Pa·s, synthesized according to the method of Example 1, 13.2 parts of bis(trimethoxysilyl-ethylene) dimethylsilane (the following structural formula), and 0.5 parts of dioctyltin dineodecanoate were mixed under a moisture blocking condition until the resulting mixture became homogeneous to prepare a composition.

[Chem. 33]

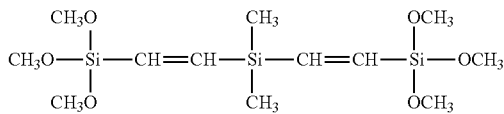

Example 7

A composition was prepared in a similar manner to Example 6 except that the same amount of tetramethylguanidylpropyl trimethoxysilane was used in place of dioctyltin dineodecanoate.

Example 8

A composition was prepared in a similar manner to Example 7 except that the same amount of di-n-butyl-dimethoxy tin was used in place of tetramethylguanidylpropyl to trimethoxysilane.

Example 9

A composition was prepared in a similar manner to Example 8 except that 100 parts of the silanol-group-terminated polypropylene glycol (polymer B) having viscosity of 10.0 Pa·s, synthesized according to the method of Example 2, was used in place of the silanol-group-terminated polypropylene glycol (polymer A) having viscosity of 4.0 Pa·s, synthesized according to the method of Example 1.

Example 10

A composition was prepared in a similar manner to Example 9 except that 6.6 parts of vinyltrimethoxysilane was used in place of bis(trimethoxysilyl-ethylene) dimethylsilane.

Example 11

A composition was prepared in a similar manner to Example 9 except that 13.9 parts of vinyltriisopropoxysilane was used in place of bis(trimethoxysilyl-ethylene) dimethylsilane and that the same amount of dioctyltin dineodecanoate was used in place of di-n-butyl-dimethoxy tin.

Examples 12 to 14

A composition was prepared in a similar manner to Examples 9 to 11 except that 100 parts of the silanol-group-terminated polypropylene glycol (polymer C) having viscosity of 1.3 Pa·s, synthesized according to the method of Example 3, was used in place of the silanol-group-terminated polypropylene glycol (polymer B) having viscosity of 10.0 Pa·s, synthesized according to the method of Example 2.

Examples 15 to 17

A composition was prepared in a similar manner to Examples 9 to 11 except that 100 parts of the silanol-group-terminated polypropylene glycol (polymer D) having viscosity of 9.2 Pa·s, synthesized according to the method of Example 4, was used in place of the silanol-group-terminated polypropylene glycol (polymer B) having viscosity of 10.0 Pa·s, synthesized according to the method of Example 2.

Examples 18 to 20

A composition was prepared in a similar manner to Examples 9 to 11 except that 100 parts of the silanol-group-terminated polypropylene glycol (polymer E) having viscosity of 26.5 Pa·s, synthesized according to the method of Example 5, was used in place of the silanol-group-terminated polypropylene glycol (polymer B) having viscosity of 10.0 Pa·s, synthesized according to the method of Example 2.

Comparative Example 1

A composition was prepared in a similar manner to Example 6 except that the same amount of MS polymer S303H (polyoxypropylene polymer having both molecular chain terminals blocked with dimethoxysilyl groups) manufactured by Kaneka Corporation was used in place of polymer A.

Subsequently, each of the compositions immediately after preparation in Examples 6 to 20 and Comparative Example 1 was extruded into a sheet shape having a thickness of 2 mm and exposed to air at 23° C. and 50% RH. Subsequently, the physical properties (initial physical properties) of a cured product obtained by leaving the sheet for seven days in the same atmosphere were measured in accordance with JIS K-6249. Note that the hardness was measured using a durometer A hardness meter of JIS K-6249. The results are illustrated in Tables 1 and 2.

TABLE 1

|  | Example | | | | | | | |
|---|---|---|---|---|---|---|---|---|
|  | 6 | 7 | 8 | 9 | 10 | 11 | 12 | 13 |
| Hardness | 31 | 30 | 32 | 21 | 10 | 10 | 55 | 22 |
| Elongation (%) | 100 | 50 | 90 | 50 | 180 | 170 | 20 | 60 |
| Tensile strength (MPa) | 0.39 | 0.34 | 0.42 | 0.32 | 0.17 | 0.19 | 0.63 | 0.51 |

TABLE 2

| | Example | | | | | | | Comparative Example |
| --- | --- | --- | --- | --- | --- | --- | --- | --- |
| | 14 | 15 | 16 | 17 | 18 | 19 | 20 | 1 |
| Hardness | 21 | 34 | 10 | 15 | 27 | 11 | 10 | 3 |
| Elongation (%) | 80 | 40 | 150 | 185 | 100 | 200 | 225 | 205 |
| Tensile strength (MPa) | 0.31 | 0.36 | 0.18 | 0.24 | 0.49 | 0.23 | 0.19 | 0.21 |

It was confirmed that each of the cured products obtained in Examples 6 to 20 satisfied equivalent rubber properties (elongation and tensile strength) to a conventional modified silicone rubber cured product based on MS polymer S303H having a terminal blocked with a dialkoxysilyl group, manufactured by Kaneka Corporation, illustrated in Comparative Example 1. As for the hardness, it was confirmed that a rubber cured product having higher hardness than the conventional modified silicone rubber cured product could be obtained.

Therefore, by using the novel polyoxyalkylene compound having a silanol group-containing reactive silicon group at a molecular chain terminal according to the present invention as a base polymer of a room-temperature-curable composition (modified silicone RTV composition), it is theoretically possible to use not only an alkoxy type group as a hydrolyzable group of a crosslinking agent but also various curing agents (for example, an organosilicon compound containing various hydrolyzable groups such as oxime, amide, aminoxy, acetic acid (acetoxy group), and alcohol (alkoxy group)) as a crosslinking component. This makes it possible to obtain various curing reaction (condensation reaction) types of room-temperature-curable compositions (modified silicone RTV compositions).

The invention claimed is:

1. A room-temperature-curable composition comprising:
   (a) 100 parts by weight of a linear polyoxyalkylene compound having a number average molecular weight of 200 to 50,000 is represented by the following structural formula (2):

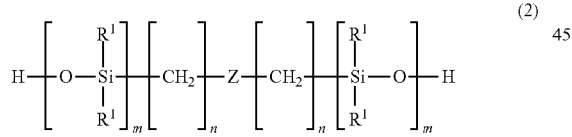

(2)

wherein $R^1$ may be the same or different, and each represents an alkyl group having 1 to 20 carbon atoms, in which an alkyl group having 3 or more carbon atoms may be a cyclic cycloalkyl group, an aryl group having 6 to 20 carbon atoms, an aralkyl group having 7 to 20 carbon atoms, a hydrogen atom, or a triorganosiloxy group represented by $(R^3)_3Si$—O— wherein each $R^3$ is the same or different, and denotes a monovalent hydrocarbon group having 1 to 20 carbon atoms, n represents an integer of 2 to 8, m represents an integer of 2 to 8, Z is represented by the following formula (4):

(4)

wherein $R^4$ represents a divalent hydrocarbon group, p represents an integer of 2 or more, and the broken line represents a linking bond;

(b) 0.1 to 30 parts by weight of:
   a hydrolyzable organosilicon compound having two alkoxysilyl-vinylene groups on the same silicon atom, represented by the following general formula (7):

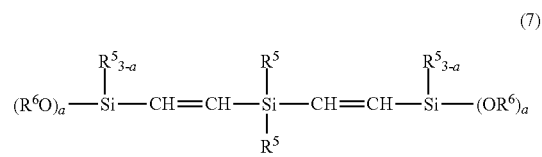

(7)

wherein $R^5$ independently represents an unsubstituted or substituted monovalent hydrocarbon group having 1 to 20 carbon atoms, $R^6$ represents an unsubstituted or substituted alkyl group having 1 to 20 carbon atoms, or an unsubstituted or substituted cycloalkyl group having 3 to 20 carbon atoms, and a represents an integer of 1 to 3;

(c) 0.01 to 20 parts by weight of a curing catalyst;
per 100 parts by weight of the component (a),
(d) 3 to 1,000 parts by weight of a filler; and/or
(e) 0.1 to 30 parts by weight of an adhesion promoter; and
(f) 0.1 to 100 parts by weight of an organopolysiloxane represented by the following general formula (8):

(8)

wherein $R^7$ independently represents an unsubstituted or substituted monovalent hydrocarbon group free of an aliphatic unsaturated bond having 1 to 20 carbon atoms, and q represents such a numerical value that the organopolysiloxane has viscosity of 1.5 to 1,000,000 mPa·s at 23° C.

* * * * *